(No Model.)
F. BAIN.
DYNAMO ELECTRIC MACHINE.
No. 493,745. Patented Mar. 21, 1893.
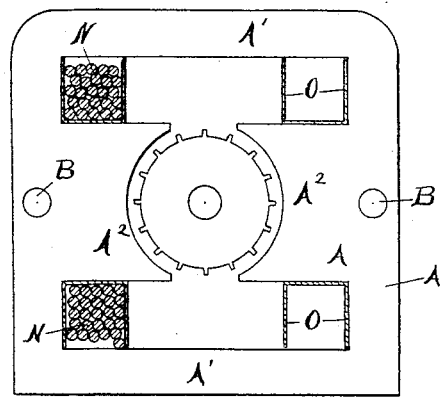
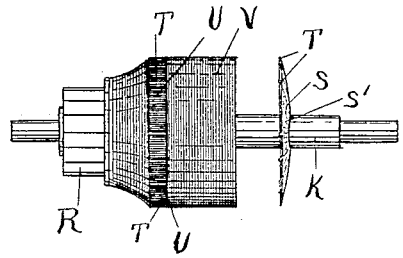
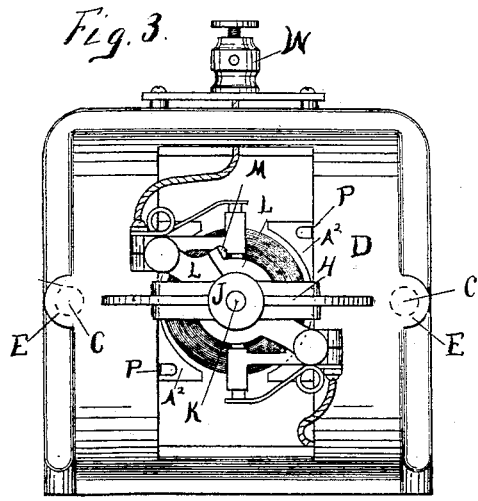
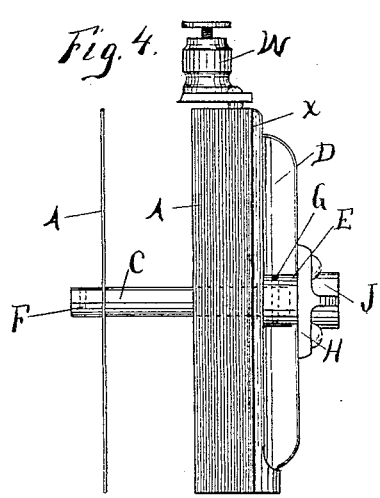

UNITED STATES PATENT OFFICE.

FORÉE BAIN, OF CHICAGO, ILLINOIS.

DYNAMO-ELECTRIC MACHINE.

SPECIFICATION forming part of Letters Patent No. 493,745, dated March 21, 1893.

Application filed December 21, 1891. Serial No. 415,686. (No model.)

*To all whom it may concern:*

Be it known that I, FORÉE BAIN, a citizen of the United States, residing at Chicago, in the county of Cook and State of Illinois, have invented a new and useful Improvement in Dynamo-Electric Machines, of which the following is a full, clear, and exact specification.

My invention relates to dynamo electric machines, and has for its object to provide a machine capable of having its parts quickly assembled, and otherwise being cheap, simple, and convenient as to its manufacture and operation. It is illustrated in the accompanying drawings where I have set forth either generator or motor, wherein;

Figure 1 is a cross section showing parts of the machine removed. Fig. 2 is a detail of the armature shaft and plates. Fig. 3 is an end view of the machine. Fig. 4 is a longitudinal detail view of the field magnet plates.

Like parts are indicated by the same letters in all the figures.

A A are thin plates of which the frame and field magnets of the machine are built up.
They are preferably stamped out of thin sheet metal and consist of the external frame A' and inwardly projecting pole forming pieces $A^2$.

B B are holes through such plates adapted to register with each other and to receive the securing rods C C.

D D are end plates which inclose the machine proper, one being placed at each end. Each plate is provided with the perforated bosses E E into which the ends of the rods C C pass. Said rods are perforated at F each to receive the pin G whereby the field magnets composed of a suitable number of plates, and the end pieces of the machine, are held securely together. Each of the end plates D D is provided with a suitable arch H containing the boxing J in which the armature shaft K is journaled.

I have shown in Fig. 3 the brush arrangement ordinarily employed on a motor.

L L are the parts of a brush holder adjustably secured by the screw M on to an inward projection or collar on the arch H, and to this brush holder I secure the brushes and the connecting wires in any desired or convenient manner.

N N are field magnet coils each in the boxes O O, which boxes are inserted between the opposed poles until they register with the space about said poles, and then are brought into position as indicated in Fig. 1. The outer plates $A^2$ $A^2$ on each side are provided with a lip P formed by cutting and then turning up a strip of the metal of such plate, and by this means the coils are held in position.

R R are commutator segments suitaby secured to the shaft K. On this shaft are placed a suitable number of disks S, having ribs T, and centrally dish-shaped as indicated at S'. These dish-shaped plates are forced into position until each falls into a plane at right angles to the shaft as indicated at Fig. 2, and when all are in position the armature windings U U may be applied.

W W are the binding posts of the machine.

The use, operation, and method of construction of my machine are as follows:

Assuming the parts to be constructed substantially as shown, the several elements may be built as follows: The boxes O O of a suitable size for the machine in process of construction are filled with wire wound into them in the usual manner to constitute a field magnet coil. The field magnets are then built up from the plates A in substantially the following manner: One of the plates D is placed in position in a suitable frame and the plates A insulated, if desired, are successively set up in such frame and forced gradually and firmly together by any suitable clamp or press. The field magnet coil boxes are then inserted and brought to the position indicated in Fig. 1, and the lips P P are turned up at the ends so as to permanently fix the coils in position. A series of dish-shaped armature plates are gradually and firmly pressed together upon the shaft until the same are brought into plane substantially at right angles to the shaft, whereby they are permanently fixed upon the shaft. To more securely fix these plates upon the shaft, the said shaft may be coated with some saline solution or the like, prior to the application of the plates. The armature frame so formed is then suitably wound. This armature is then inserted in position between the pole pieces, one end being journaled in the boxing of the end plate already in position. The brushholder is then placed in position, and the other end plate D is applied outside, and the free end of the armature shaft is journaled in its boxing. The ends of the rod C C, previously inserted through the apertures B B and keyed at one end, are received into the bosses. These rods are then keyed by the keys G G whereby the entire machine is assembled ready for connection and to be placed in circuit.

Among the advantages and objects of my invention as here illustrated and set forth, are various features which I will specially enumerate: The field magnet so constructed is without joints and hence leaks are obviated, and the machine is iron clad so as to give full effect and avoid radiation. The laminated field magnet also obviates Foucault effects. The entire machine is held together by the two pins or keys in the ends of the shafts C C so that there are no nuts or bolts to be tampered with by unskillful operators. The construction of the field magnet and armature is such that both are cut from a single sheet, and thus waste of material is obviated to a great degree. The armature plates are shaped by means of a press, thus slightly stretching the aperture through them, and the parts are so proportioned that when this aperture is so slightly stretched, it almost exactly fits the shaft. When, therefore, the plate is pressed thus slightly contracting the central aperture while on the shaft, each plate will very firmly grip or hold this shaft. If necessary, the application of saline solution to the cylinder will cause the plates to more firmly adhere to the shaft. In any event, each plate has an independent attachment to the shaft, so that there is the least possible liability to shifting or loosening of the armature upon its shaft.

The end plates from which the lips P P are cut are preferably of material other than that of the field magnet plates, as, for example, tin or the like, but I do not limit myself to any special material for this purpose. I may use tin.

I claim—

1. An armature frame for dynamo electric machines consisting of a supporting shaft and a series of primarily dish-shaped plates on such shaft and flattened thereon to cause them to grip the shaft.

2. An armature frame for dynamo electric machines consisting of a supporting shaft and a series of primarily dish-shaped plates placed on such shaft, and flattened thereon to cause them to grip the shaft, said shaft treated with a saline or similar substance prior to the application of such plates.

3. An armature frame for dynamo electric machines consisting substantially of a supporting shaft with a series of plates thereon, said shaft primarily treated with a saline or similar substance to cause the plates to adhere strongly to the shaft.

4. In a dynamo electric machine, the combination of a series of plates with surrounding rims and inwardly projecting pole pieces end plates with lips thereon, and coils which surround such pole pieces and are secured in position by such lips when turned up.

FORÉE BAIN.

Witnesses:
WALTER J. GUNTHORP,
W. E. GASTMAN.